Aug. 11, 1925.

S. B. WINN 1,548,965

TRACTOR TRAILER COMBINATION

Filed April 19, 1920     3 Sheets-Sheet 1

Inventor
Sidney B. Winn,
Attorney

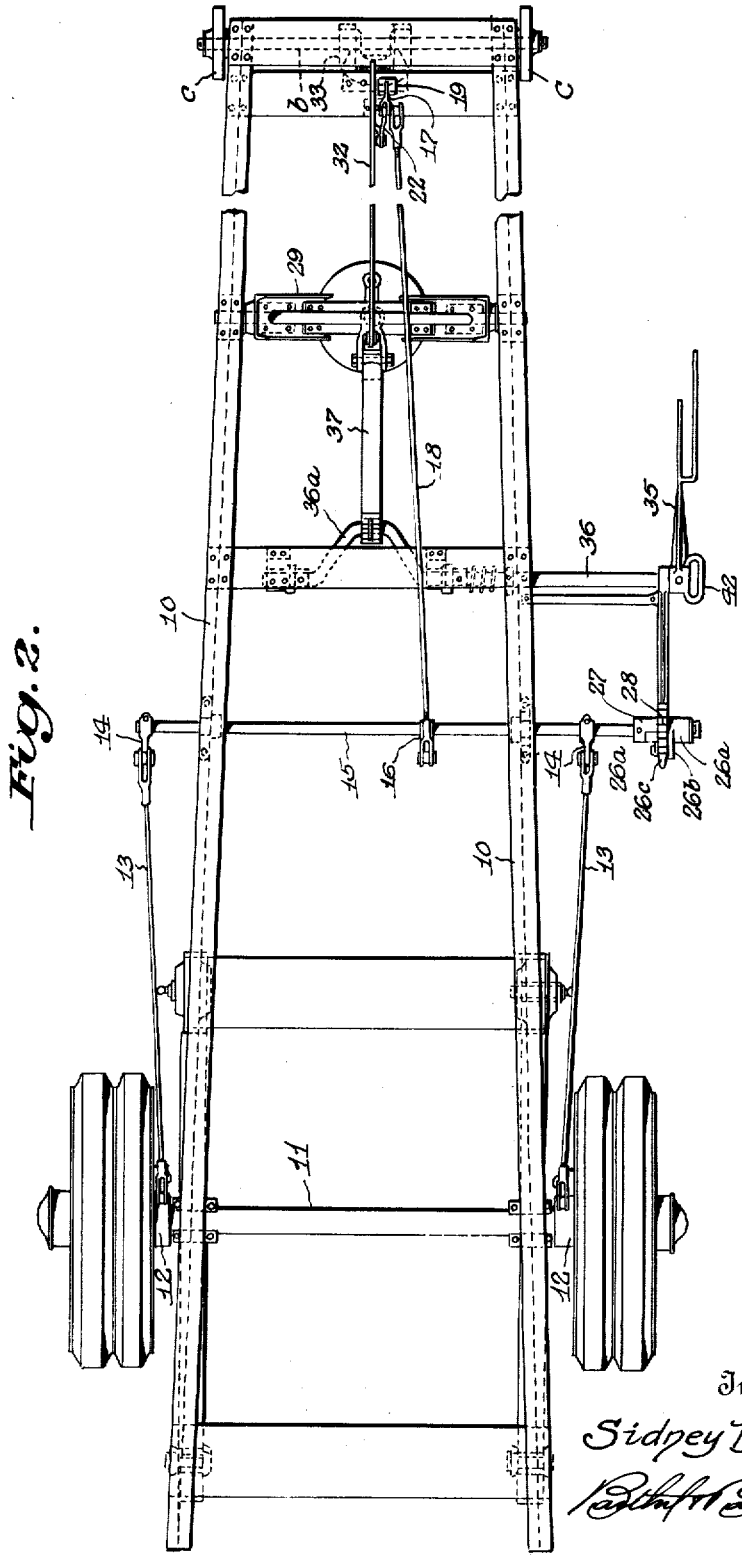

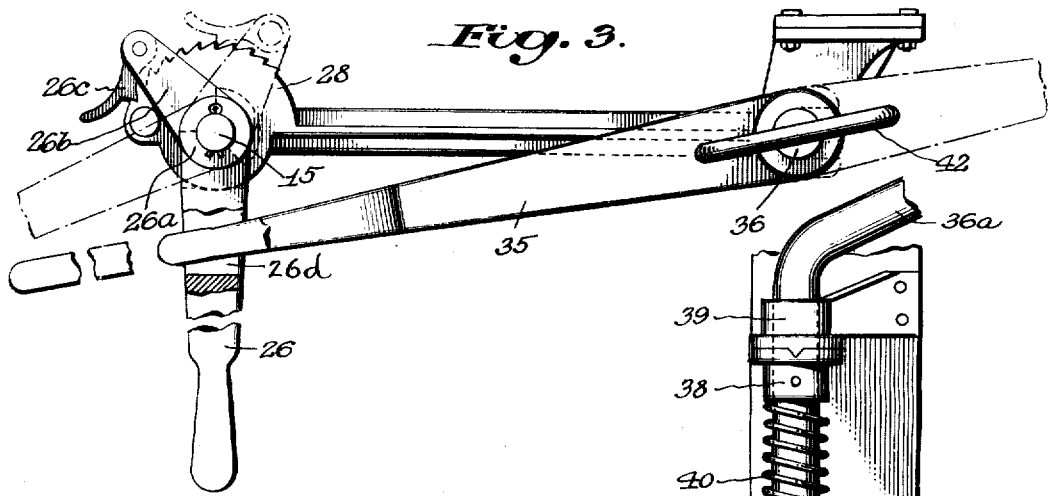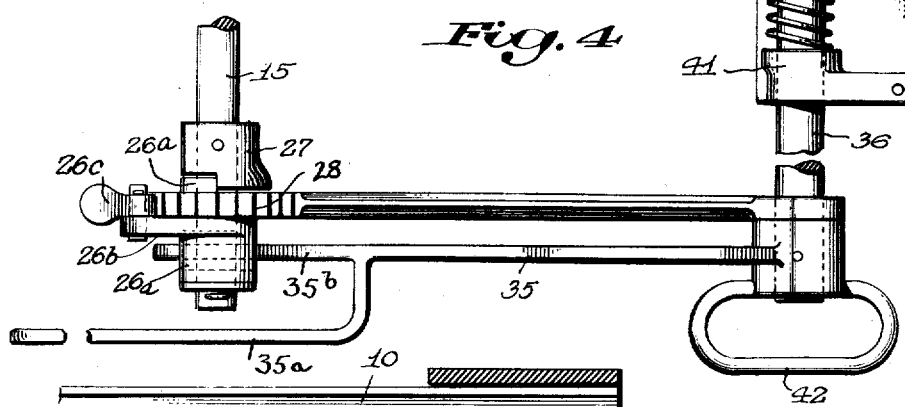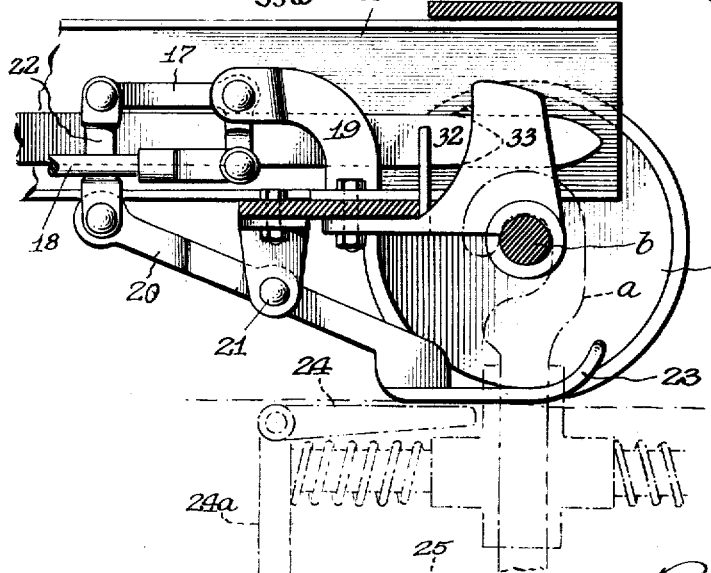

Patented Aug. 11, 1925.

1,548,965

UNITED STATES PATENT OFFICE.

SIDNEY B. WINN, OF LAPEER, MICHIGAN, ASSIGNOR TO LAPEER TRACTOR TRUCK COMPANY, OF LAPEER, MICHIGAN, A CORPORATION OF MICHIGAN.

TRACTOR TRAILER COMBINATION.

Application filed April 19, 1920. Serial No. 374,889.

*To all whom it may concern:*

Be it known that I, SIDNEY B. WINN, a citizen of the United States of America, residing at Lapeer, in the county of Lapeer and State of Michigan, have invented certain new and useful Improvements in Tractor Trailer Combinations, of which the following is a specification, reference being had therein to the accompanying drawings.

This invention relates to improvements in tractor-trailer combinations, pertaining more particularly to structures in which the trailer is supported by and detachable from the tractor at will.

Tractor-trailer structures, especially of this particular type are designed for heavy load service conditions, and also for relatively low cost operating conditions, the latter result being obtained by the detachability of the trailer thus permitting the tractor to serve continuously with a number of trailers, although the trailer itself is intermittently retained at desired points for loading and unloading. And since trailers of this type are of the one truck form there are a number of conditions set up in the use of such combinations requiring the solution of various problems in order to produce a combination which is capable of efficient service, is durable in construction and which can be manufactured at a relatively low cost. Among these are the following:—

When the trailer is attached to the tractor—making practically a three truck formation made up of three pairs of wheels,—the connection between the trailer and the tractor must be such as to prevent any possibility of disengagement of the trailer excepting at the will of the operator; in other words, the connection must be secure and must be of a type which will permit of the proper articulation of the trailer and tractor in use. When the trailer and tractor are connected provision should be present for applying brakes to the trailer in addition to the brakes which are carried on the tractor; and it should be possible to set the trailer brakes from the tractor during such period in order that entire control of the combination may be had from the tractor. The connections for the trailer and tractor should be such as will permit of ready disconnection and for re-connection when these actions are to be provided; and since the trailer may be carrying a load of several tons at such time, the connections must be such as will permit the operations to be had in a simple and efficient manner and without the necessity of requiring a number of operators for expenditure of long periods of time. And, owing to the fact that complete disconnection of trailer and tractor is provided at such times, the connections between the trailer and the tractor must be of a type which will permit of the break in the operating connections for the brake mechanism of the trailer with the tractor in such manner that the parts will be positioned to provide for automatic restoration of operating conditions when the trailer is again connected; otherwise, it will be necessary to provide manual release of and re-engagement of operating connections between such trailer brake mechanism and the tractor.

Since the truck for the trailer is generally located at the rear of the trailer, it is essential that provision be made for supporting the front portion of the trailer when the latter has been disconnected; and such support should be so arranged that when in supporting position, the front end of the trailer will be so located as to permit of ready positioning of the tractor for purposes of re-engagement of the combination. To permit of this being done in each instance—to prevent the possibility of the operator disengaging the trailer at a time when provision has not been made to support the front end of the trailer—provision should be made to prevent disconnection of trailer and tractor until such support or prop has been placed in position. This can be provided by operatively connecting the trailer and tractor connecting means with the support or prop in such manner that the connecting means cannot be disengaged until the proper support is in supporting position or in the position which is required, when the disconnection of trailer and tractor carries the trailer from off of the tractor so as to be free from support by the latter. The arrangement should also be such as to meet and prevent the possibility of shifting of the support or prop from an inoperative position to its supporting position through the jars and shocks incident to travel; since the prop or support movements are designed to control the connection between the trailer and tractor, any accidental shifting of the support or prop from its inoperative to its active position would tend to bring about a condition within the trailer and tractor connections such as would permit of disengagement of trailer from the tractor at an undesired period.

When the trailer is disengaged from the tractor, it should be held against movement, excepting when such movement is desired. This can be provided by the use of a prop or support which will fixedly retain the trailer in position but this would not permit of movement of the trailer when free from the tractor. A preferred arrangement is to utilize the brake mechanism of the trailer for this purpose, the brake mechanism being used during the period when the trailer is disengaged. This latter condition also provides, if efficient service is desired, for providing a number of different control factors. For instance, it is desirable that the brake mechanism be set prior to disengagement of trailer and tractor in order that movement of the tractor to produce the disengagement will not affect the position of the trailer; and in addition assurance should be had that the brakes are set. This result can be obtained by so arranging the different structures that it is necessary to set the brakes before it is possible to shift the support or prop to its active position, the support movement controlling the connections between trailer and tractor as heretofore indicated; and this control can be utilized for insuring that the brake mechanism is set at the time when the operation of coupling the trailer and tractor together takes place, by making the control of such form that the mechanism for shifting the support or prop to its inactive position cannot locate the support in such position unless the brake mechanism has been set. As a result, the brake mechanism is retained in such position until after the coupling of the trailer and tractor has been completed and the two structures are so connected as to insure proper travel.

As it is desirable to shift the position of the trailer when detached from the tractor, it is preferred to employ the wheeled form of front end support of a trailer, this arrangement practically providing for a two-truck trailer when the support is in its active position. Obviously, the two-wheeled truck would permit of ready shifting of the trailer from one position to another, and the brake mechanism is so arranged as to prevent this being done accidentally, and at the same time providing for control features, heretofore referred to. To permit of temporarily releasing the brake mechanism to permit this shifting action when desired, the operating mechanism is so arranged as to permit of release of the brakes while the support is in its active position.

The present invention is designed to provide for a construction capable of producing these results, and at the same time employ a simple and efficient construction of parts not likely to be damaged or disarranged under rough service conditions. At the same time, the construction is such as to employ a minimum number of parts, readily accessible to the operator, so that it is possible for a single operator to control the use of the combination, regardless of the particular load—within the capacity of the trailer itself—or the particular conditions of service.

To these and other ends, therefore, the nature of which will be readily understood as the invention is hereinafter disclosed, said invention consists in the improved construction and combination of parts, as hereinafter fully described, illustrated in the accompanying drawings, and more particularly pointed out in the appended claims.

In the accompanying drawings, in which similar reference characters indicate similar parts, in each of the views, Figure 1 is a side elevation of a trailer embodying general features in the present invention, the tractor being omitted, a few of the operating connections thereof being shown in dotted lines;

Fig. 2 is a top plan view of the same;

Figs. 3 and 4 are views in side elevation and top plan respectively, of a portion of operating control mechanism employed in producing some of the results heretofore pointed out;

Fig. 5 is a view partly in section and partly in elevation of a portion of the control mechanism for the front end of the trailer, the view showing some of the tractor construction to indicate the operation of the control mechanism.

Figure 1:
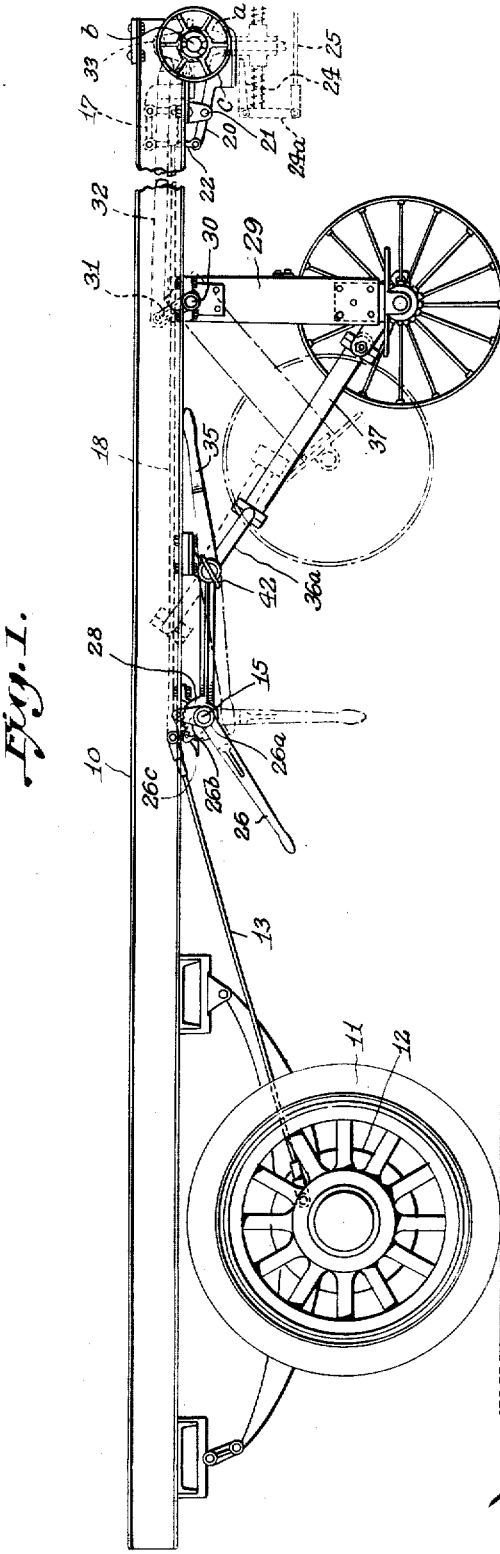

The tractor construction may be of any preferred type, preference being had, however, to the type shown in the patent granted Sept. 23, 1919, No. 1,316,660, in which the tractor frame carries a king bolt having a hook shaped upper end indicated, for instance, at —a— in Fig. 5 herein, such hook-shaped end being adapted to engage a member —b— carried by the trailer, the king bolt being preferably located within a formation which permits of yielding of the bolt support in a front to rear direction. The tractor also carries a pair of tracks at opposite sides of the king bolt, these tracks being designed to permit of the travel thereon of a pair of wheels —c— carried by the trailer, this structure being such as to provide a fifth wheel arrangement to permit of proper articulating action between the tractor and trailer while preserving the connection therebetween. In addition the rear portion of the tracks are preferably inclined downward, so that in disengaging the trailer, the wheels of the latter travel downwardly over the track until the support or prop contacts with the surface of the ground, these tracks being so arranged as to permit of a considerable downward movement if necessary, it being understood, of course, that as soon as the support or prop takes the load of the trailer from off the tractor, the wheels —c— leave the tracks. When it is desired to couple the trailer to the tractor, the latter is backed up to the trailer in such way that the wheels —c— contact with these inclined portions of the tracks whereupon during further backing movement of the tractor, the wheels are caused to ride up the inclined portions of the track, thus raising the front end of the trailer and the support, off of the ground, transferring the load from the truck to the tractor, the backing movement continuing until member —b— engages the king bolt —a—, the yielding of the king bolt support, taking up the shock which may be provided during the coupling operation. Such brake operating mechanism carried by the tractor is found in the present drawings, the remainder of the tractor being omitted, it being understood that the brake operating mechanism is carried to the cab of the tractor and is placed under the control of the operator of the tractor.

The trailer structure comprises the main frame 10 of suitable character having its rear end mounted upon a truck formation, indicated generally at 11, the wheels of which carry the usual brake drum structures with which the band brake formation indicated at 12, cooperates. This arrangement is of any preferred structure, the invention not being limited to any particular type, the brake band formation being so arranged as to tighten the brakes by forward movement of a connecting rod 13, the advance end of which is connected to a crank arm 14 carried by a shaft 15 extending transversely of the frame 10. In the particular arrangement shown, each wheel is provided with a brake band and two separate connecting rod portions 13 are employed, these being mounted on shaft 15 as shown in Fig. 2. Obviously, a different type of brake formation may be employed, as for instance, one which operates in connection with the face of the wheel, this being a well known alternative construction to that disclosed.

To provide for setting the brakes from the tractor, shaft 15 carries an additional crank 16 which is operatively connected with one arm of a bell crank lever 17 by a connecting rod 18, lever 17 being mounted in a suitable bracket 19 carried at the front of the trailer. The other arm of lever 17 is connected with a lever 20 pivoted to a bracket 21 projecting below the front end of the frame 10 adjacent member —b—, the connection between said levers being through a connection 22. The front end of lever 20 is provided with a shoe formation 23, preferably so formed as to straddle the king bolt —a— when the trailer is in attached position, the bottom of the shoe being on approximately the plane of the bottom of the wheel —c—.

When lever 20 is in the position shown in Fig. 5, the brakes are unset, the shaft 15 being in a position where the brake bands are free from braking relation with the brake drums. If the shoe formation 23 be moved upwardly by rocking lever 20, lever 17 will be rocked in a counterclockwise direction, Fig. 5, thus drawing connections 18 forwardly and rocking shaft 15 in a direction to cause the bands to be applied to the brake drum. This upward movement of the shoe formation may be provided in any manner from the tractor, a simple structure for providing this result being by the use of a bell crank formation or a fabricated equivalent of it, of which one arm 24 underlies the shoe formation when the trailer and tractor are connected, the opposite arm 24ª being connected to a connecting rod 25 which leads to the operating mechanism within the cab of the tractor, drawing forward of connection 25 serving to raise the shoe formation and therefore apply the brakes. When the arm 24 is dropped downward the relative weight of parts is such as to cause the shoe formation to drop, thus restoring the brakes to an inactive position. If desired, springs may be employed to aid in this movement but, in practice, such auxiliary is not found necessary. As will be understood, the shoe formation 23 is of a type which will not engage any of the parts of the tractor when the wheels —c— are moving to position the formation having its front end open to permit of the ready passage of the king bolt between the two forks of the formation provided by this construction. It will be obvious that when the parts are in position to permit the detaching of the trailer, the shoe will freely pass out of relation with arm 24. When the shoe formation and arm are in the position shown in Fig. 5, it will be readily understood that setting the brakes on the trailer can be readily provided by the operator within the cab, thus placing the brake control of the trailer entirely within the control of such operator while the trailer and tractor combination are traveling in service.

Provision is also made for setting the brakes manually, this action being provided by the use of a lever 26, (Fig. 3), this lever having an operative connection with the shaft 15 such as will cause the brakes to be set when the lever 26 is moved clockwise in Fig. 3. This connection is not a direct one for the reason that it is desired to permit shaft 15 to have its rocking movement under the operation of the shoe formation 23 without affecting the position of lever 26, lever 26 being designed not only as an operating lever for the brake mechanism, but also to provide for a safety factor presently described and as a control factor, the position of lever 26 being made effective for these purposes. Lever 26 is formed in such manner as to provide, when mounted on shaft 15, a lost motion connection with the shaft 15, this being provided by the use of a lug construction 26ª on the hub of lever 26, this lug having faces cooperating with a member 27 secured on shaft 15 (Figs. 3 and 4), the arrangement being such that member 27 can rock clockwise in Fig. 3 with the clockwise movement of shaft 15. Without disturbing the position of lever 26, the return of the member 27 to its normal position—that shown in Fig. 4—bringing opposing faces of member 27 and lugs 26ª into contact, so that if lever 26 is shifted in clockwise direction it will act on member 27 to rock the shaft 15 in the proper direction. The hub of lever 26 is mounted loosely on the shaft, and carries an arm 26ᵇ on which is pivotally supported a latch finger 26ᶜ adapted to ride over the face of a segment 28 carried as a part of a supporting frame for this mechanism the segment having teeth with which the pawl or latch member 26ᶜ can engage, as shown in dotted lines, this arrangement being provided to permit lever 26 to be held in its shifted position, the brakes remaining set.

As heretofore explained, it may be desirable to shift the detached trailer from one position to another, and this cannot be readily done with the brakes set. By the particular form of connection shown, it will be readily understood that with lever 26 in its set position, as for instance shown in dotted lines Fig. 3, it will be necessary only for the operator to raise pawl 26ᶜ whereupon lever 26 will return to the full line position and release the brakes, permitting the trailer to be shifted about. After the shifting movement has been completed, it is necessary only to bring lever 26 back to the dotted line position to again set the brakes.

The support, prop, or rest member for the front end of the trailer when detached is shown as in the form of a wheeled frame 29 supported on a shaft 30 carried by the trailer, the connection being such as to permit of a rocking movement of the frame between full line and dotted line positions of the frame in Fig. 1. The shaft 30 is provided with a crank 31 to which is pivoted the rear end of a bar 32. This bar 32 extends forwardly substantially in the medial line of the trailer to a point in juxtaposition to a keeper 33 which is positioned to overlie the king bolt —a— when the trailer and tractor are coupled together, the member 33 being of a bail like formation into which the king bolt extends when the tractor is being backed into position. As pointed out in the patent heretofore referred to, the king bolt is normally held in an upper position, a position above that indicated in dotted lines in Fig. 5, the distance being less than that required to permit member —b— to enter into the recess provided for the king bolt; the king bolt is yieldably mounted to permit this movement, and, when the hook of the king bolt comes into contact with member —b—, the bolt is raised a further distance sufficient to clear the top of member —b—, whereupon during further backward movement of the tractor, the hooked end will pass over member —b— and snap back into the normal position, the yielding king bolt construction permitting this snap action both in entering and in withdrawal of the member from the hook through, the movement of the tractor. However such normal position of the king bolt would not provide for the proper coupling action since there would be an insufficient amount of holding between member and hook to permit the draft action required in the combination. It is to meet this condition that bar 32 is utilized. This bar, the advance end of which is in approximately the position shown in dotted lines, in Fig. 5, when the parts are being coupled and uncoupled, is advanced when the coupling action is to be completed, this bar being somewhat pointed and readily entering into the space between the normal position of the hook —a— and keeper 33, the advance of the bar serving to depress the king bolt —a— into the position shown in Fig. 5, bar 32 remaining in the position and forming an absolute lock against the return of the king bolt to normal position, so that the connection between the trailer and tractor is practically locked against any uncoupling action which might be produced accidentally or through the effect of jars, shocks, etc. When it is desired to uncouple, the needle bar 33 is drawn rearward, whereupon the king bolt —a— assumes its normal position, whereupon a forward movement of the tractor will permit the bolt to be snapped out of position relative to member —b— and the trailer and tractor entirely uncoupled.

The movement of the needle bar 32 is provided by a rocking movement of shaft 30, or of frame 29 if the frame be pivotally mounted on the shaft, the needle bar being in its rearward position when frame 29 is in the full line position of Fig. 1, the bar being in its advance position when the frame 29 is shifted to the dotted line position. This particular arrangement is had so that assurance is had that the support of the trailer will be in position whenever it is possible to uncouple the trailer from the tractor, the dotted line position of the frame 29 representing the inactive position of the support, in which position the shift in position of the crank 31 serves to advance the needle bar into its position to form an abutment between the bail 33 and the top of the king bolt.

The shifting of frame 29 is provided by movements of a lever 35, the latter being secured on a shaft 36 mounted in bearings on frame 10 and which is bent, or otherwise formed with an offset or cranked portion 36ª, the position of this portion being such as to permit of the connection thereto of the rear end of a member 37, the forward end of which is connected to a suitable part of frame 29, this providing a simple connection between shaft 36 and the frame, so that as shaft 36 is rocked the cranked portion 36ª will operate to shift the frame 29 between the two positions as shown.

It is desirable, although not absolutely essential, that the frame 29 be held in either of the positions shown, and this may be provided in any suitable manner. For instance, one way in which this result has been obtained is by mounting a collar 38 on shaft 36,—the collar being secured to the shaft—, while a complemental member is loosely mounted on the shaft and secured to a suitable part of the frame 10, this latter structure being indicated at 39. The parts 38 and 39 are the equivalent of a two-point coupling, the opposing faces being arranged so that engagement will be had between a projection and a recess when the shaft is rocked a distance of substantially 180 degrees. A spring 40 is mounted on the shaft between the collar 38 and a bearing 41, the spring 40 serving to normally hold the two coupling members 38 and 39 in engagement. As will be understood, if shaft 36 be given a longitudinal movement sufficient to disengage the mating projection and recess, shaft 36 can then be rocked without difficulty. But when the coupling is in mating relation, the parts will then retain the frame 29 in the desired position. Any particular type of coupling may be employed for this purpose, the desire being to provide a two-point construction such as will retain the frame 29, forming the support or prop for the front end of the trailer—in either of its extremes of movement. To provide for ready longitudinal movement of the shaft, I may employ the handle 35 with a grip 42, this arrangement permitting one hand of the operator to draw the shaft 36 towards him and begin the rocking movement of the shaft by manipulation of lever 35.

As shown in Figs. 3 and 4, lever 35 is of more or less particular construction, having an offset portion 35ª which projects outwardly beyond the remainder of the handle, the latter being continued in the form of a finger 35ᵇ which extends in the plane of a recess or opening 26ᵈ formed in the handle 26 (Fig. 3).

When the parts are in the proper position, the finger 35ᵇ will be located in the slot or recess 26ᵇ as shown in Fig. 3, the finger thus operating to prevent lever or handle 35 from dropping downward under the weight of the support or prop should anything happen to jar the couplings 38 and 39 or should there be a break between these parts, this finger providing a supplemental safety structure in this respect. In addition, however, this finger provides for a specific control action in the operation of the parts, as will be readily understood from the following description of the general operation, in which it is assumed that the trailer and tractor are operatively connected together, and the two coupled parts have been placed in the position where it is desired to leave the trailer. In this position the support or prop is in the dotted line position of Fig. 1, held by the members 38, 39, and by the finger 35ᵇ; the king bolt is in locked position with needle bar 32 in its forward position; handle lever 26 is in the position shown in Fig. 3 with the brakes unset, all parts being in the positions of travel, in which it is possible for the operator to set the brakes on the trailer through the manipulation of the shoe formation.

In beginning the uncoupling operation, the handle 26 is first shifted in a clockwise direction, thus setting the brake mechanism and releasing finger 35ᵇ, pawl 26ᶜ engaging one of the teeth of segment 28 and retaining the handle lever 26 in the position in which it is placed. This locks the trailer against movement through the setting of the brakes, and at the same time releases finger 35ᵇ, so that if the operator draws shaft 36 in longitudinal direction, he is able to rock this shaft by the movement of handle 35 in a counterclockwise direction in Fig. 3, carrying it to the full line position of Fig. 1. This movement of shaft 36 shifts the position of the crank portion 36ª an angular distance of 180 degrees and carries the connection 37 in a direction to move frame 29 from the dotted line position of Fig. 1 to the full line position, coupling members 38 and 39 re-engaging after this movement has been completed. It may be noted at this point that while the wheel frame 29 is shown as of a length sufficient to retain frame 10 in a horizontal position, this height of the support or prop may vary, and in practice, it is generally the case that the distance between the bottom of the wheel of frame 29, and the ground at this period of the operation—it being understood, of course, at this time the king bolt is still engaging member —b— is approximately five inches, so that actual contact of the wheel and the surface of the ground is only had after the tractor has been withdrawn and the wheels —c— passed downward over the inclined track portion, gradually lowering the front portion of the trailer until the wheel or frame 29 contacts with the ground. By permitting frame 29 to assume this position in advance of actual contact with the ground, assurance is had that the full movement of frame 29 will be had regardless of minor inequalities in the surface of the ground.
This shifting of frame 29 from dotted line position to that shown in full lines, has as heretofore pointed out, a retracted needle bar 32, permitting the king bolt to rise to its normal position. This places the two parts—the trailer and tractor—in position for separation, and it is necessary only for the driver of the tractor to start forward, the set brakes serving to retain the trailer against movement and produce the resistance desired in snapping the king bolt off of member —c—, the tractor then continuing to advance, the wheel —c— gradually passing on to the inclined parts of the track and gradually lowering the front end of the trailer until the wheel of frame 29 contacts with the ground, thus leaving the trailer in position with the brakes set, the tractor being free to perform other service.
If, while detached, it is desired to move the trailer, from one position to another, it is necessary only to raise pawl 26ᵇ, swing handle lever 26 back to the full line position of Fig. 3 thus releasing the set position of the brakes and permitting the trailer to be moved about, it being understood, of course, that handle lever 35 is not moved during this operation. After the trailer has been properly shifted, it is necessary only to swing handle lever 26 to the dotted line position to restore the set condition of the brakes and retain the trailer at the new points.

When it is desired to again couple up the trailer with the tractor, the latter is brought to the proper point in advance of the trailer and then backed into position such as will permit the wheels —c— to contact with the track of the tractor. Since the brakes of the trailer are set, it will be readily understood that if the tractor be backed after such contact is had, the front end of the trailer will be raised by the travel of wheels —c— on the tractor track, the wheels passing over the inclined portion on to the horizontal portion, passing forward through the relative movement of the trailer and tractor—the tracks moving in a rearward direction with the ascent of the wheels, since the brakes are set. Member —b— is thus carried into contact with the king bolt, further rearward movement of the tractor causing the king bolt to rise so as to permit the entrance of member —b— and after the entrance has been completed the king bolt snaps back so as to prevent a rebounding action such as would cause the two parts to separate. In other words, the snap feature is designed as a safety factor to insure that the king bolt is properly coupled. Since the contact of the rear of the king bolt recess with the member —b— practically provides the entire resistance of the trailer against further backing movement, it will be understood that the resistance at this time will be sufficient notice to the operator of the coupling having taken place.

At this time, the brakes are still set and the supports or prop is in its lowered position, although the prop is out of contact with the ground. The next operation is to shift frame 29 to its inactive position and concurrently lock the king bolt against withdrawal, and this is provided by moving handle lever 35 from the full line position in Fig. 1, to the dotted line position by a clockwise movement of the member, this being made possible by reason of the initial longitudinal movement of shaft 36, and the fact that handle lever 26 is in the full line position of Fig. 1, with the brakes set. In this position of lever 26, finger 35ᵇ is free to move a complete angular distance of substantially 180 degrees, thus bringing the support to a position where the coupling member 38 and 39 will provide the coupling engagement. In this position, lever 26 is then swung counterclockwise to the dotted line position, placing the finger 35ᵇ into the slots or openings 26ᵈ, placing the parts in position for travel.
As will be understood, if, during the final portion of the coupling operation lever 26 be moved to release the brake before operating lever 35, and an attempt is made to drive the tractor forward, no damage will result, through the fact that should there be sufficient resistance to permit the snapping of the king bolt from out of member —b—, the support or prop is still in position to support the front end of the trailer. And should the operator first shift lever 26 to the dotted line position and then attempt to shift lever 35, the finger 35ᵇ will prevent proper shifting action and the operator will be made aware of the fact that he has released the brakes prior to the time when they should be released, thus requiring him to again set the brakes in order that the prop may be placed in proper position.

As will be readily understood, the various factors which have heretofore been pointed out, are all produced by the use of simple mechanisms, with the arrangement such as to provide for a methodical practice both in coupling and in uncoupling, thus insuring that the proper protective measures have been taken in both operations, making the structure more or less "fool proof". At the same time, the simplicity of the mechanisms employed permits of the use of rugged and substantial structures so that they will be sufficient to meet the service conditions which are extremely severe in connection with trailer and tractor practice, especially where the work is being done under heavy service conditions.

The advantages are believed to be obvious and have been generally pointed out heretofore.

While I have herein shown and described a preferred arrangement of parts, it will be readily understood that variations and modifications and changes therein, may be found desirable or necessary to meet the exigencies of use, and I desire to be understood as reserving the right to make any and all such changes, variations or modifications, as may be found desirable or essential, in so far as the same may fall within the spirit and scope of the invention, as expressed in the accompanying claims when broadly construed.

What I claim is:—

1. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and control means normally active in preventing rest-member movement from its inactive position and associated with the brake mechanism and rest member instrumentalities and arranged relatively therein in such manner that setting activity of the brake mechanism is required in advance of movement of the rest member to its active position.

2. The combination with a tractor and means for maintaining the position of the trailer detachably engageable at will, of trailer when free from tractor engagement and support, said means including brake mechanism on the trailer, a rest member for supporting the trailer when detached and shiftable into and out of an active position, mechanism for shifting said rest member at will, and control means normally active in preventing rest-member movement from its inactive position and associated with the brake mechanism and rest member instrumentalities and arranged relatively therein in such manner that shifting movement of the rest member from inactive position is made dependent upon prior application of the brake mechanism.

3. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, mechanism for shifting said rest member at will, and control means normally active in preventing rest-member movement from its inactive position and associated with the brake mechanism and rest member instrumentalities and arranged relatively therein in such manner that shifting movement of the rest member from inactive position is made dependent upon prior application of the brake mechanism, said brake mechanism being movable between applied and unapplied positions at will regardless of the position of the rest member.

4. A combination as in claim 2, characterized in that the brake mechanism includes an operating lever, with the lever and member shifting mechanism having complemental formations cooperative in the control means.

5. In combination with a tractor and trailer detachably engageable at will, of means for maintaining the position of the trailer when free from tractor engagement and support, said means including brake mechanism on the trailer, a rest member for supporting the trailer when detached and shiftable into and out of active position, mechanism for shifting said rest member to and from its active position, said mechanism including a lever having a finger, said brake mechanism, including an operating lever having a configuration to receive said finger when the rest member is in inactive position.

6. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, mechanism for shifting said member to and from its active position, and including means for retaining the rest member in either of two positions, and auxiliary means operative to maintain the rest member in one of such positions upon failure of the normal retaining means.

7. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and including means for retaining the rest member in either of two positions, and auxiliary means operative to maintain the rest member in one of such positions upon failure of the normal retaining means, said auxiliary means including a lever operative in the brake mechanism.

8. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and means for moving said rest member, said means including a crank shaft, a lever for rocking said crank shaft, and connections between the crank shaft and rest member, whereby movements of the lever will swing the rest member between its active and inactive positions, said connections and shaft crank being relatively arranged to locate the crank and connections in approximate alinement when the rest member is in active position.

9. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and means for moving said rest member, said means including a crank shaft, a lever for rocking said crank shaft, and connections between the crank shaft and rest member, whereby movements of the lever will swing the rest member between its active and inactive positions, said connections and crank shaft being relatively arranged to locate the crank and connections in approximate alinement when the rest member is in active position, the shaft movement in shifting the rest member approximating an angular distance of 180 degrees.

10. The combination with a tractor and trailer detachably engageable at will, of means for maintaining the position of the trailer when free from tractor engagement and support, said means including brake mechanism on the trailer, a rest member for supporting the trailer when detached, and shiftable into and out of an active position, and means for moving said rest member, said means including a crank shaft, a lever for rocking said crank shaft, and connections between the crank shaft and rest member, whereby movements of the lever will swing the rest member between its active and inactive positions, and means operative to substantially lock the shaft when the rest member is in either position, said latter means including a member carried by the trailer frame, and a member carried by the shaft, said members having complemental face configurations operative to normally prevent rocking movement of the shaft.

11. The combination with a tractor and trailer detachably engageable at will, of means for maintaining the position of the trailer when free from tractor engagement and support, said means including brake mechanism on the trailer, a rest member for supporting the trailer when detached, and shiftable into and out of an active position, and means for moving said rest member, said means including a crank shaft, a lever for rocking said crank shaft, and connections between the crank shaft and rest member, whereby movements of the lever will swing the rest member between its active and inactive positions, and means operative to substantially lock the shaft when the rest member is in either position, said latter means including a member carried by the trailer frame, and a member carried by the shaft, said members having complemental face configurations operative to normally prevent rocking movement of the shaft, said shaft being movable endwise to render said members inactive to permit movement of the rest member from one position to the other.

12. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and control means normally active in preventing rest-member movement from its inactive position and associated with the brake mechanism and rest member instrumentalities and arranged relatively therein in such manner that setting activity of the brake mechanism is required in advance of movement of the rest member to its active position, and means within the brake mechanism whereby the brakes may be released at will when said rest member is in active or inactive position.

13. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and control means whereby setting activity of the brake mechanism is required in advance of movement of the rest member to its active position, and means within the brake mechanism whereby the brakes may be released at will when said rest member is in its active position, said latter means including a pawl and ratchet device rendered active by the normal brake setting operation, said device being rendered inactive at will by disengagement of pawl and ratchet.

14. The combination with a tractor and trailer detachably engageable at will, of means for maintaining the position of the trailer when free from tractor engagement and support, said means including brake mechanism on the trailer, a rest member for supporting the trailer when detached and shiftable into and out of an active position, and control means whereby setting activity of the brake mechanism is required in advance of movement of the rest member to its active position, and means within the brake mechanism operative to permit release of the set brake mechanism at will, such release of the brake mechanism in the presence of rest member activity rendering the control means active to prevent location of the rest member in its inactive position until activity of the brake mechanism has been restored.

15. The combination of a tractor and trailer detachably engageable at will, means for maintaining the position of the trailer when free from tractor engagement and support, said means including a rest member movable into and out of a supporting position, brake mechanism, control mechanism associated with the brake mechanism and rest member instrumentalities and arranged relatively therein in such manner that movement of the rest member to active position is made dependent upon prior activity of the brake mechanism, and means for maintaining the coupled relation of the tractor and trailer, said latter means including coupling mechanism, and a member operative to lock the coupling mechanism to prevent disengagement of the tractor and trailer, said member being operatively connected to the rest member in a manner to maintain the coupling mechanism locked when the rest member is inactive and permit uncoupling by movement of the rest member to active position.

16. In tractor trailer combinations wherein the tractor and trailer are maintained locked against uncoupling under combined service conditions and the trailer position is maintained when the tractor and trailer are uncoupled, brake mechanism carried by the trailer, a rest member for the trailer movable between active and inactive positions solely when the brake mechanism is active, coupling mechanism, and means for locking the coupling mechanism, said means including an element carried by the trailer and movable into and out of locking position by the movements of the rest member, said element being operative to lock the coupling mechanism when the rest member is located in its inactive position and to release the coupling mechanism by movement of the rest member to active position, whereby uncoupling of the tractor and trailer is made dependent upon prior activity of the brake mechanism.

17. In tractor-trailer combinations wherein the tractor and trailer are maintained locked against uncoupling under combined service conditions, and the trailer position is maintained when the tractor and trailer are uncoupled, brake mechanism carried by the trailer, coupling mechanism, means for locking the coupling mechanism, said means including an element carried by the trailer and movable into and out of locking position, said element operating to maintain the coupling mechanism locked during combined service conditions, and means controlled by brake mechanism condition for controlling the time when element movement to unlock the coupling mechanism is permitted, said brake mechanism being operative independent of element operation, element unlocking operation being limited to periods when the brake mechanism is active.

18. In trailer tractor combinations wherein the trailer and tractor are coupled together for combined service operation and disengageable to permit independent service, and wherein the trailer may be maintained in position when in indepedent service, brake mechanism carried by the trailer and operative in maintaining such trailer position, said mechanism including a rock shaft, and independent means for operating said shaft to provide rocking movement to the shaft from the tractor when the combined service conditions are present and independently of the tractor when the trailer is in independent service.

19. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service operations and rendered inactive by the uncoupling of the tractor and trailer, and means for rocking said shaft independently of the tractor operating means, said latter means being inactive during shaft operation from the tractor.

20. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service operations and rendered inactive by the uncoupling of the tractor and trailer, and means for rocking said shaft independently of the tractor operating means, said tractor shaft operating means being rendered inactive during activity of the independent means.

21. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service conditions and rendered inactive by the uncoupling of tractor and trailer, and a lever for operating the shaft independently of the means, said lever having a lost motion connection with the shaft to permit said means of operation while maintaining the position of the lever constant.

22. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service conditions and rendered inactive by the uncoupling of tractor and trailer, and a lever for operating the shaft independently of the means, said lever having a lost motion connection with the shaft to permit said means of operation while maintaining the position of the lever constant, lever operation of the shaft to render the brake mechanism active rendering the means inactive.

23. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service conditions and rendered inactive by the uncoupling of tractor and trailer, said means including a leverage system carried by the trailer adjacent the coupling mechanism, said system including an element having an extended face, said system being operatively connected to said shaft, and a pivoted arm carried by the tractor and adapted to co-operate with said element when the trailer and tractor are coupled, and means on the tractor for rocking said arm.

In testimony whereof I affix my signature in the presence of two witnesses.

SIDNEY B. WINN.

Witnesses:
ANNA M. DORR,
KARL H. BUTLER.

21. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service conditions and rendered inactive by the uncoupling of tractor and trailer, and a lever for operating the shaft independently of the means, said lever having a lost motion connection with the shaft to permit said means of operation while maintaining the position of the lever constant.

22. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service conditions and rendered inactive by the uncoupling of tractor and trailer, and a lever for operating the shaft independently of the means, said lever having a lost motion connection with the shaft to permit said means of operation while maintaining the position of the lever constant, lever operation of the shaft to render the brake mechanism active rendering the means inactive.

23. In trailer tractor combinations wherein the trailer and tractor are coupled together for combined service operation and disengageable to permit independent service, and wherein the trailer may be maintained in position when in independent service, brake mechanism carried by the trailer and operative in maintaining such trailer position, said mechanism including a rock shaft, means for operating the shaft from the tractor during combined service conditions and rendered inactive by the uncoupling of tractor and trailer, said means including a leverage system carried by the trailer adjacent the coupling mechanism, said system including an element having an extended face, said system being operatively connected to said shaft, and a pivoted arm carried by the tractor and adapted to cooperate with said element when the trailer and tractor are coupled, and means on the tractor for rocking said arm.

In testimony whereof I affix my signature in the presence of two witnesses.

SIDNEY B. WINN.

Witnesses:
ANNA M. DORR,
KARL H. BUTLER.

Certificate of Correction.

It is hereby certified that in Letters Patent No. 1,548,965, granted August 11, 1925, upon the application of Sidney B. Winn, of Lapeer, Michigan, for an improvement in "Tractor Trailer Combinations," errors appear in the printed specification requiring correction as follows: Page 6, line 12, strike out the article "a", and lines 75 and 76, for the misspelled word "operaor" read *operator;* page 7, claim 2, line 43 should be line 42, and line 42 should be 43; page 9, line 87, claim 18, for the misspelled word "indepedent" read *independent;* and that the said Letters Patent should be read with these corrections therein that the same may conform to the record of the case in the Patent Office.

Signed and sealed this 13th day of October, A. D. 1925.

[SEAL.]

KARL FENNING,
*Acting Commissioner of Patents.*

Certificate of Correction.

It is hereby certified that in Letters Patent No. 1,548,965, granted August 11, 1925, upon the application of Sidney B. Winn, of Lapeer, Michigan, for an improvement in "Tractor Trailer Combinations," errors appear in the printed specification requiring correction as follows: Page 6, line 12, strike out the article " a ", and lines 75 and 76, for the misspelled word " operaor " read *operator;* page 7, claim 2, line 43 should be line 42, and line 42 should be 43; page 9, line 87, claim 18, for the misspelled word " indepedent " read *independent;* and that the said Letters Patent should be read with these corrections therein that the same may conform to the record of the case in the Patent Office.

Signed and sealed this 13th day of October, A. D. 1925.

[SEAL.]
KARL FENNING,
*Acting Commissioner of Patents.*